May 27, 1952  J. C. WILLIMAN  2,598,328
OPTICAL REVERSER OF PHOTOGRAPHIC NEGATIVES
Filed Jan. 12, 1950  2 SHEETS—SHEET 1
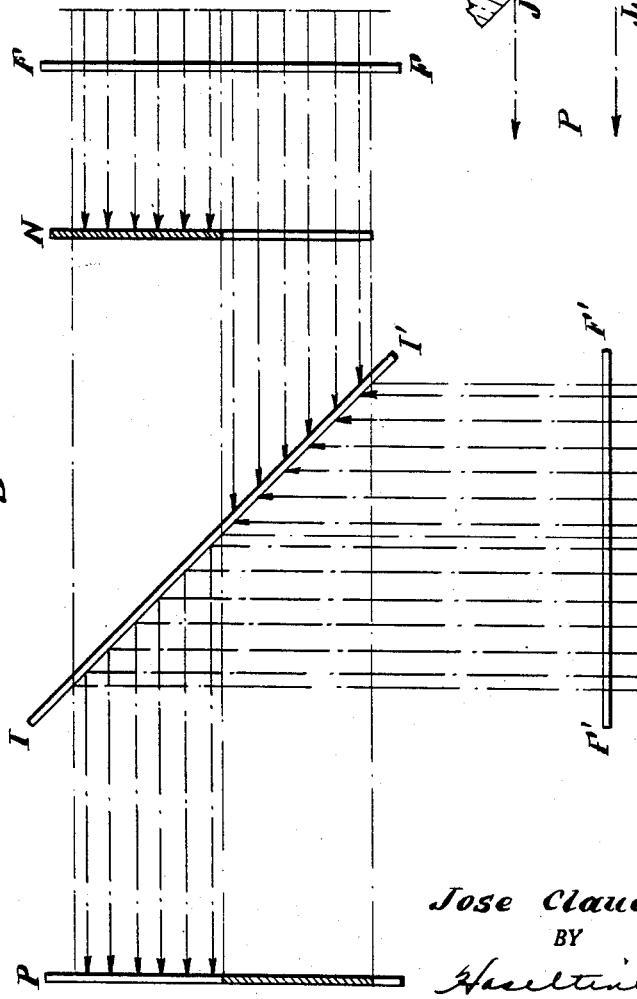
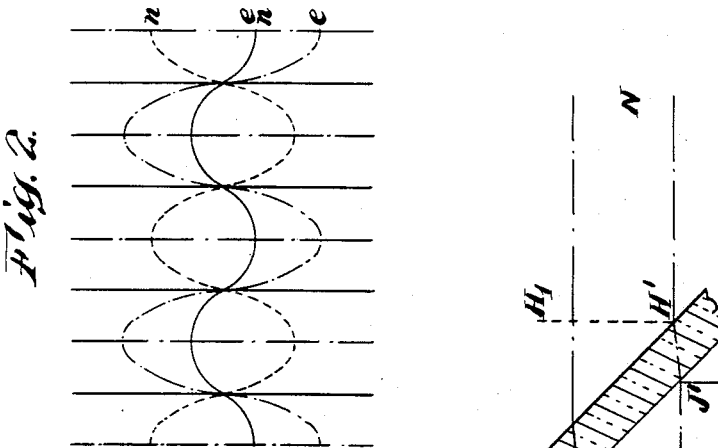
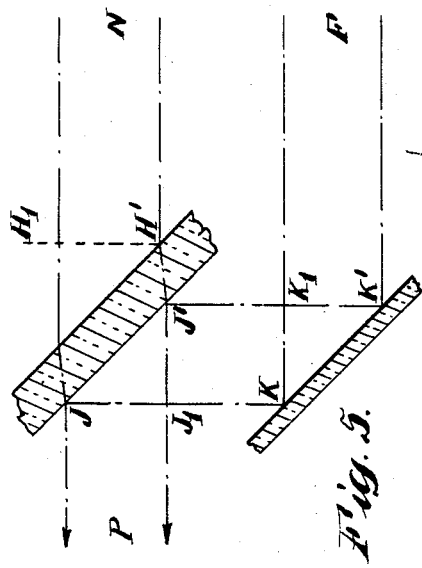
INVENTOR.
Jose Claudio Williman
BY
Hazeltine, Lake & Co.
AGENTS.

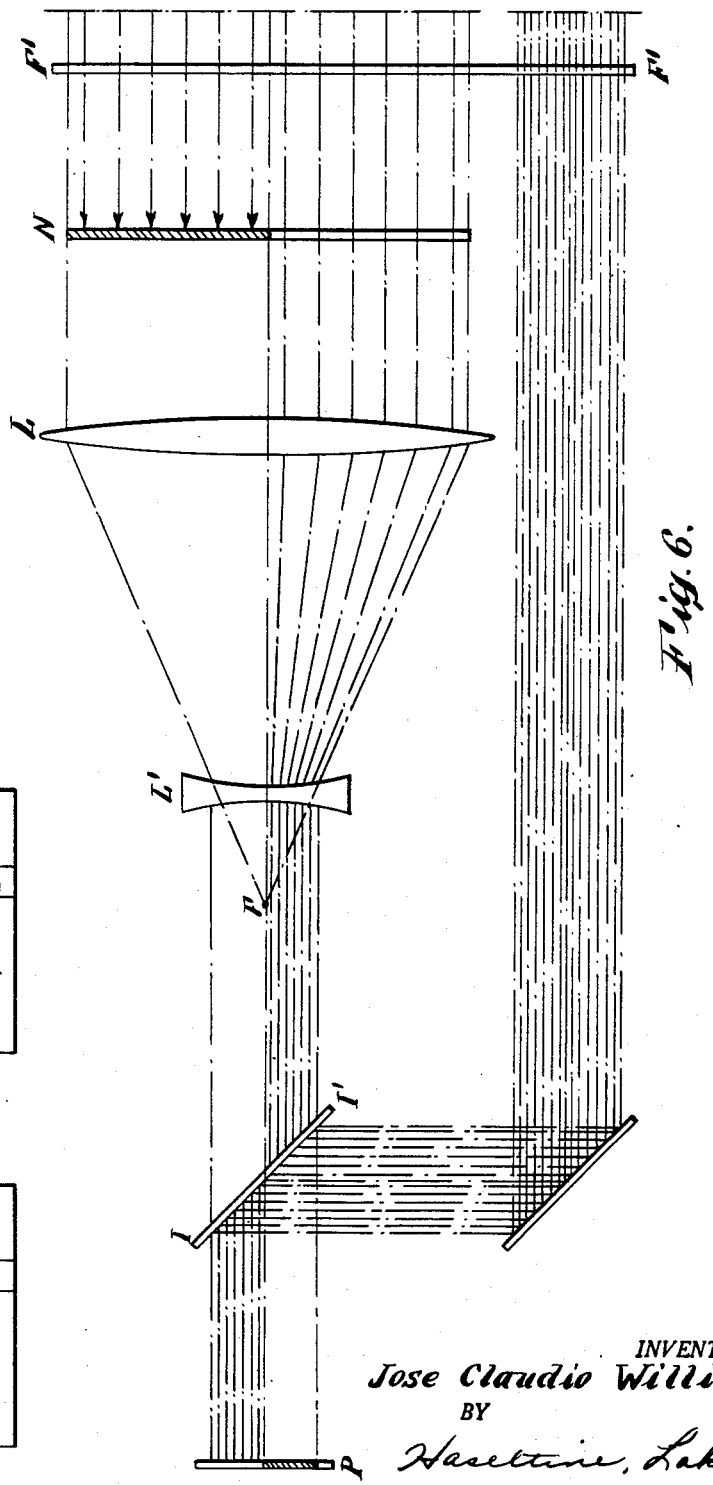

Patented May 27, 1952

2,598,328

UNITED STATES PATENT OFFICE 2,598,328

OPTICAL REVERSER OF PHOTOGRAPHIC NEGATIVES

José C. Williman, Montevideo, Uruguay

Application January 12, 1950, Serial No. 138,078

5 Claims. (Cl. 88—1)

The present invention relates to a reverser of photographic negatives, i. e., an optical apparatus adapted to see a negative as if it were a positive, whether on a plate or film without the need of making permanent copies.

My device is based on the well known phenomena of luminous interferences resulting when two sets of light waves of the same wave length, but of opposite phases, are projected against a screen or other receiving surface.

In order that my invention may be clearly understood and carried into effect I have illustrated same in the accompanying drawing in which Fig. 1 is a diagram representing the theory of my device for shadeless negatives, i. e. with portions totally transparent or totally opaque.

Fig. 2 is a diagram which does not represent any of the parts of the device, but a luminous phenomenon produced in any of the points in the lamina I—I', part P, when the negative has shades, i. e., portions of different degrees of transparency.

Fig. 3 and Fig. 4 are diagrams which supplement the description given under Fig. 2.

Fig. 5 is a diagram to show that when in one of the points on the face of lamina I—I', part P, one of the possible cases as mentioned in Fig. 2 takes place, the same case is repeated on all the points of the said face.

Fig. 6 is a diagrammatic side elevational view of a portion of a device embodying the present invention and including a lens system permitting the viewing of relatively large negatives.

The following is the theory of my invention as shown in Figure 1:

I take, starting with the simplest case, a shadeless negative, i. e. having parts respectively totally transparent and totally opaque.

A negative N (Fig. 1) is placed in the path of a beam of parallel and monochromatic light rays passing through a preferably yellow light filter F—F. A transparent crystal lamina or flat plate I—I' of small and uniform thickness is disposed in front of the negative N and is inclined at an angle of 45° relative to the parallel light rays $n$ passing through the negative.

A second beam $e$ of parallel rays of monochromatic light, originating from the same source (not shown) as the above mentioned beam of light rays passing through the negative N, is projected at right angles to that beam to impinge against the front face of the crystal lamina I—I' after passing through a filter F'—F'. Since the light rays $n$ passing through the negative N and thence through the crystal lamina I—I' from the rear of the latter as well as the light rays $e$ impinging against the front face of the crystal lamina originate from the same source and pass through identical filters F—F and F'—F', all of the light rays will be of the same wavelength or frequency. The path of travel of the light rays $n$ passing through the filter F—F and the path of the light rays $e$ passing through the filter F'—F' are arranged so that the paths differ in length by a half wavelength or any odd multiple of a half wavelength. Thus, the light rays $e$ passing through the filter F'—F' and striking against the front surface of the crystal lamina will be out of phase by 180°, at that front surface, with respect to the light rays $n$ passing through the filter F—F, the negative N and the crystal lamina I—I'.

The above described out-of-place relationship of the two groups or beams of light rays originating from the same source and finally reaching the front face of the crystal lamina I—I' may be achieved with any of the conventional and known structures employed in interferometers.

If the negative N is removed from the path of the light rays passing through the filter F—F, all of the light rays $e$ passing through the filter F'—F' will be destructively interferred with by the first mentioned light rays at the front surface of the crystal lamina I—I', and none of the light rays $e$ passing through the filter F'—F' will be reflected forwardly off the front surface of the crystal lamina to impinge against a frosted viewing glass or screen P so that the latter will be dark over its entire area. However, conversely, if a completely opaque negative is interposed in the path of the light rays passing through the filter F—F, so that none of these light rays are transmitted through the crystal lamina I—I', the light rays passing through the filter F'—F' will all be reflected forwardly from the front surface of the crystal lamina, since there is no interference, to impinge against the viewing screen P and light up the entire area of the latter.

When the negative N has certain portions which are completely opaque (as indicated by the cross-hatching in Fig. 1) and other portions which are completely transparent, the interference phenomena described above will operate to provide a reversal image of the negative on the viewing screen or plate P as follows:

The light rays in the upper portion of the monochromatic beam extending from the filter F—F of Fig. 1 are stopped by the opaque (crosshatched) upper portion of the negative N while the light rays in the lower portion of that beam will pass through the transparent lower part of the negative as at $n$ and through the crystal lamina to the front surface of the latter. The light rays $e$ of the monochromatic beam extending from the filter F'—F' and impinging against the lower part of the crystal lamina I—I' will be destructively interfered with by the light rays $n$ passing through the lower transparent portion of the negative N and this destructive interference, indicated by the meeting arrows of Fig. 1, will prevent reflection of the light rays against the screen P in this area. However, the remainder of the light rays $e$ extending from the filter F'—F' will strike against the upper portion of the front surface of the crystal lamina I—I', and since the negative N has prevented the passage of light rays therethrough in the area corresponding to this upper portion of the lamina, these remaining light rays will be reflected forwardly, as at $en$, to illuminate the upper portion of the viewing screen P. Thus, the upper portion of the viewing screen P will be light and the lower portion thereof will be dark, which is the reverse of the negative N.

In case of a negative with shades, that is, not only with parts completely transparent and completely opaque, but also with parts having different degrees of transparency, the different degrees of transparency produce different degrees of luminous intensity in the different places of the beam of light rays $n$ (Fig. 1) which are incident on lamina I—I'.

Since the rays $e$ and $n$ are oppositely phased at the front surface of the transparent crystal plate or lamina I—I', the amplitude or intensity of the ray $en$ (Fig. 1) reflected forwardly against the screen P from any particular point at the front face of the plate I—I' will be the difference between the amplitude of the wave or ray $e$ impinging against that particular point and the amplitude of the wave or ray Y reaching that point after passage through the negative N and the plate I—I'.

This is explained in Fig. 2, wherein the curve $e$ represents the vibrations of the beam $e$ and the curve $n$ the vibrations of the beam $n$.

The vertical lines in Fig. 2 are "ordinates," i. e., lines of reference the equal separation of which indicate equal periods of one-quarter wavelength. The separations are the same because of the isochronism of the luminous vibrations.

The vibrations which reach P (beam $en$) are represented by the curve $e$—$n$, each one of whose ordinates is the difference between the ordinates of the other two curves, in the same instant.

As $e$ is constant and $n$ generally smaller than $e$ (it is never larger), and variable according to the characteristics of the negative, the difference $e$—$n$ will change to a contrary direction to $n$; the larger or smaller $n$ is the smaller or larger, respectively, will be $e$—$n$. Consequently there is an inversion of shades, which is indispensable to see the negative as a positive.

*Example.*—As regards negative N (Fig. 3) the maximum transparency of which is represented as a value of 5, its total opacity as 0 and its shades as 2, 3 and 4, applying to each zone the formula $e$—$n$, transformed in this case in $5$-$n$ a positive P (Fig. 4) is obtained.

Referring now to Fig. 6, a portion of a device for viewing photographic negatives as positives and embodying the present invention is there illustrated. In the device of Fig. 6, a single light filter F'—F' is provided so that the beams of parallel light rays passing therethrough and originating at a single source (not shown) will be monochromatic and preferably yellow.

The negative N is supported by suitable structure (not shown) to extend across the upper beam of parallel and monochromatic light rays. Lenses L and L' arranged in front of the negative N provide a convergent optical system to reduce the cross-section of the beam of light rays passing through the negative. A transparent crystal lamina or plate I—I' which is perfectly flat and of uniformly small thickness is supported in the path of the parallel light rays $n$ extending from the convergent optical system and at an angle of 45° relative to such rays. The provision of the convergent optical system, constituted by the lenses L and L', permits the use of a relatively small plate I—I' so that relatively large negatives may be viewed without necessitating the use of a correspondingly large crystal lamina I—I'. Since the crystal lamina must be perfectly flat and of uniformly small thickness, the use of a lamina of relatively small plan form is a practical necessity.

A mirror E is arranged below the crystal lamina or plate I—I' and is parallel to the latter in the path of the lower beam of parallel and monochromatic light rays to reflect the latter upwardly, as at $e$, against the front surface of the crystal lamina I—I'. Finally, a viewing plate or screen P, which may be formed of ground or frosted glass, is arranged in front of the crystal lamina I—I' to receive the light rays reflected forwardly from the latter.

While the structure to the right of the filter F'—F' in Fig. 6 is not illustrated, it is to be understood that conventional elements included in an interferometer are there disposed to columnate the light rays emitted from a source and then to split the beam of parallel rays into the two beams passing through the negative N and reflected by the mirror E, respectively, so that the light rays of the two beams are of the same wavelength and initially in phase and are out of phase at the front surface of the crystal lamina I—I' by reason of the different lengths of the paths of travel of the related light rays in the two beams. It is apparent that adjustment of the spacing of the mirror E relative to the lamina I—I' will provide a ready means of assuring the out-of-phase relationship of the light rays in the two beams.

The different rays which reach lamina I—I', after passing through the negative N, travel, as a consequence of the inclination of the lamina, different distances, and the rays $e$ reflected by the mirror E against the front or exit face of the crystal lamina also each travel a different distance.

It may be thought, because of this, that if the rays N, H', J', P and E, J', P, for example, interfere (Fig. 5) the same thing will not happen with the N, H, J, P and E, J, P.

The fact is that provided the lamina has an inclination of 45 degrees and not any other, the increase H—$H_1$, of the travel of a ray over one of the others which come from N, is equal to the increase J—$J_1$ of one ray over any other, coming from E.

Consequently, whenever interference is produced in the meeting of two rays in the exit face of the lamina, the same degree of interference will be repeated for all the points of the said face providing the same relative intensities of the interfering rays are maintained.

This demonstration is a proof of the necessity of a uniform thickness of the lamina.

If desired, an amplifying lens system (not shown) may be provided for viewing the reversed image of the negative N projected on the screen P.

Having described an embodiment of the present invention, it is apparent that a device has been provided operating on the principle of interference of out-of-phase light rays and permitting the viewing of a photographic negative as a positive.

Fig. 6 shows all the optical elements of my invention and the box or container in which same are placed. Figs. 7 and 8 are front and and side views of the apparatus.

In Fig. 6 a convergent magnifying ocular not shown as an element in Fig. 1, has been added.

So as not to complicate Fig. 6, the enlarged image which said ocular would give of the image in P has not been indicated.

In this manner, and in case of small negatives (films or negatives of minicameras) not only would they be seen as positives but also enlarged.

And if the negative to be observed is large, same can be analyzed in sections because the place for the negative in the apparatus is open in three sides (Fig. 8).

What I claim is:

1. A device for viewing photographic negatives as positives comprising means projecting two beams of parallel rays of monochromatic light originating from a single source and conditioned to produce interference effects when combined, means for supporting a photographic negative in the path of one of said beams of light rays, a flat transparent plate of uniform thickness inclined at an angle of 45° to the axis of said one beam and in front of said negative supporting means so that monochromatic light rays passing through the supported negative are passed through the transparent plate to the front surface thereof, and a flat mirror disposed in parallel spaced arrangement relative to said plate and interposed in the path of the other of said beams to reflect the monochromatic rays of said other beam against said front surface of the transparent plate so that monochromatic light rays reflected by said mirror are reflected forwardly off said front surface of the plate, said mirror being spaced from said plate a predetermined distance so that the light rays of said one beam passed through the negative and said plate and the light rays of said other beam reflected off said front surface of the plate are oppositely phased at said front surface of the plate whereby said light rays passed through the negative and inclined plate interfere with the light rays reflected from said mirror and said front surface of said inclined plate to project an optical reversal of the image on the photographic negative.

2. A device for viewing photographic negatives as positives as set forth in claim 1; further comprising a frosted translucent screen disposed transverse to the axis of said one beam and in front of said inclined plate to receive the light rays reflected off said front surface of the inclined plate so that a positive image is formed on said frosted screen.

3. A device for viewing photographic negatives as positives as set forth in claim 2; further comprising a magnifying lens positioned in front of said frosted screen to enlarge the positive image on the latter when viewed through said magnifying lens.

4. A device for viewing photographic negatives as positives as set forth in claim 1; wherein said means projecting two beams of light rays includes a light filter which passes only monochromatic yellow light.

5. A device for viewing photographic negatives as positives as set forth in claim 1; including convergent optical means positioned between said supporting means for the photographic negative and said transparent plate so that relatively large negatives may be viewed with a device employing a transparent plate of relatively small size when viewed in plan.

JOSÉ C. WILLIMAN.

REFERENCES CITED

The following references are of record in the file of this patent:

UNITED STATES PATENTS

| Number | Name | Date |
|---|---|---|
| 1,582,262 | Goodhue | Apr. 27, 1926 |
| 2,501,446 | Kistoce | Mar. 21, 1950 |